Figure 1:
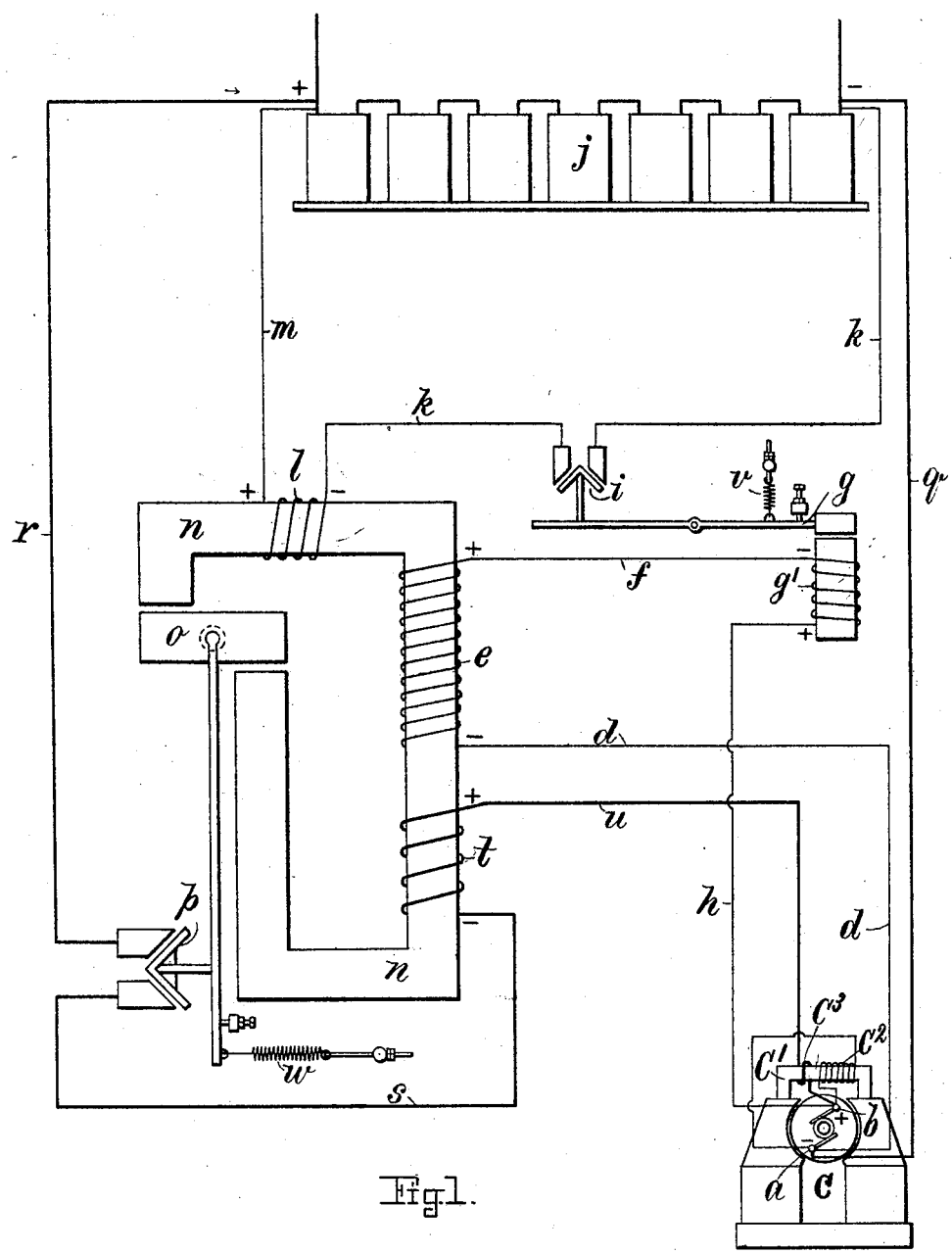

No. 607,124. Patented July 12, 1898.
W. L. NEGBAUR.
AUTOMATIC CUT-OUT FOR SECONDARY BATTERIES.
(Application filed Feb. 19, 1897.)

(No Model.) 2 Sheets—Sheet 1.

Witnesses
N. A. Dexter
Herman A. Poppenhusen

Inventor
Walter L. Negbaur
By J. J. Feely
His Attorney.

No. 607,124. Patented July 12, 1898.
W. L. NEGBAUR.
AUTOMATIC CUT-OUT FOR SECONDARY BATTERIES.
(Application filed Feb. 19, 1897.)
(No Model.) 2 Sheets—Sheet 2.
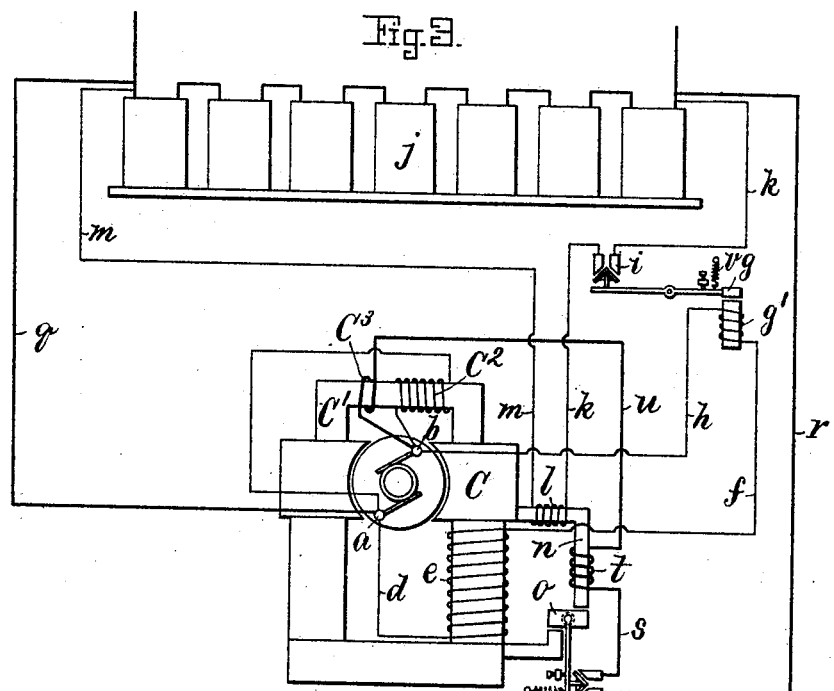
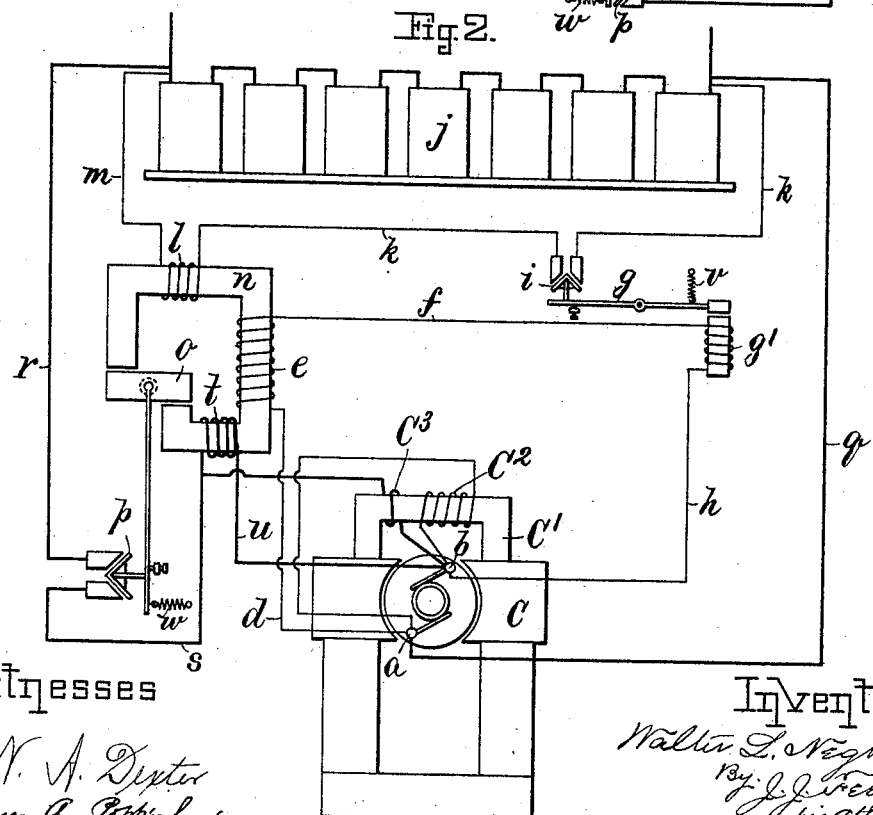
Witnesses
N. A. Dexter
Herman A. Poppenhusen
Inventor
Walter L. Negbaur
By J. J. Feely
his Attorney

UNITED STATES PATENT OFFICE.

WALTER L. NEGBAUR, OF BROOKLINE, MASSACHUSETTS.

AUTOMATIC CUT-OUT FOR SECONDARY BATTERIES.

SPECIFICATION forming part of Letters Patent No. 607,124, dated July 12, 1898.

Application filed February 19, 1897. Serial No. 624,233. (No model.)

*To all whom it may concern:*

Be it known that I, WALTER L. NEGBAUR, a citizen of the United States, residing at Brookline, in the county of Norfolk and State of Massachusetts, have invented certain new and useful Improvements in Electric Switches, of which the following is a specification.

My invention relates to electric switches, and more especially to an automatic switch for use in connection with a dynamo and a storage battery arranged to generate and utilize electric energy, the object of my invention being to provide a switch which shall automatically control the battery or working circuit by closing the same whenever the voltage of the dynamo reaches a predetermined constant excess over that of the storage battery and by breaking said circuit whenever the voltage of the dynamo in decreasing reaches that of the storage battery or just before that point, so that the battery cannot by any possibility discharge through the dynamo, and thus waste the energy which has been stored.

To this end my switch comprises a magnet-core provided with a non-polarized armature which is arranged to operate a circuit-closer and two coils on said core arranged to oppose each other in their magnetic effects, one of said coils having impressed on it the voltage of the storage battery and the other that of the dynamo and the circuit-closer being operated by the differential effect of these coils, all as hereinafter more fully explained.

In the accompanying drawings, Figure 1 represents diagrammatically a preferred form of my switch, shown in connection with a dynamo and a storage battery. Figs. 2 and 3 are diagrammatic views of slightly-modified forms of my switch.

So far as my present invention is concerned the kind of dynamo used is immaterial. The one shown in the drawings at C is a constant-voltage dynamo having a magnetic shunt C' around its armature and opposed coils $C^2$ and $C^3$ on said shunt. Neither the said dynamo nor the system of which it forms a part are claimed herein, they being claimed in Letters Patent of even date herewith, granted to Joseph J. Feely and myself, for a "Method of and apparatus for generating electricity," to which Letters Patent reference is made for a full description of the construction and mode of operation of said dynamo and system.

Referring to Fig. 1 of the drawings, $n$ represents the core of an electromagnet, and $o$ the armature thereof, these parts together forming a magnetic circuit. On the core $n$ are wound coils $e$ and $l$, the coil $e$ being a portion of a permanently-closed shunt-circuit from the terminals $a$ $b$ of the dynamo and the coil $l$ being in a shunt-circuit from the terminals of the storage battery $j$. The armature $o$ is non-polarized and is pivoted, as shown, and carries a circuit-closer $p$, which either makes or breaks the working circuit of the system, consisting of the conductors $q$ and $u$, led from the terminals of the dynamo, the storage battery $j$, the conductors $r$ and $s$, and the coil $t$, hereinafter described. The circuit-closer $p$ is normally held by the spring $w$ in such a position as to keep open the working circuit from the dynamo, as shown.

The coils $e$ and $l$ are wound and connected so as to oppose each other—that is, so as to generate magnetic lines of force in opposite directions within the magnetic circuit on which they are wound—so that the resultant magnetic flux through said circuit will depend upon the difference between the voltages impressed upon the coils $e$ and $l$ by the dynamo and the storage battery, respectively, and the armature $o$ will operate to close the working circuit through $p$ as soon as the magnetic flux thus generated is sufficient in its effect to overcome the tension of the spring $w$.

In order that the battery $j$ may not discharge through the coil $l$ when the dynamo-voltage is below the storage-battery voltage and the working circuit is open, I prefer to include a supplementary circuit-closer $i$ in the shunt-circuit which contains the coil $l$. This circuit-closer $i$ is operated by the armature $g$ of a relay-magnet $g'$, which is energized by being included in a permanently-closed shunt-circuit from the terminals of the dynamo. This shunt-circuit is preferably the one which contains the coil $e$, thus consisting of the conductors $d$, $f$, and $h$ and the coils $e$ and $g'$. A spring $v$ normally holds the circuit-closer $i$ in such position as to open the circuit through the conductor $k$. On the core $n$ I provide a third coil $t$, included in the working circuit and so connected as to generate magnetic lines in the same direction as the coil $e$. The function of this coil will presently appear.

The operation of the switch just described is as follows: The shunt-circuit which contains the coils $e$ and $g'$, being permanently closed, has impressed upon it whatever voltage may be generated by the dynamo, and this voltage, when it reaches a predetermined amount determined by the tension of the spring $v$, creates sufficient magnetism in the relay-magnet $g'$ to operate the circuit-closer $i$. At the same time the coil $e$ is caused to generate magnetic lines within the core $n$, tending to operate the circuit-closer $p$, but not quite sufficient to do so, the spring $w$ being properly adjusted to produce this result. The closing of the circuit through $k$ will cause the storage battery to send a current through the coil $l$, the strength of which will depend on the voltage of said battery, and since the magnetic lines generated by the coil $l$ are in opposition to those generated by the coil $e$ the effect of the coil $e$ upon the circuit-closer $p$ will be correspondingly diminished. Hence the armature $o$ and circuit-closer $p$ will be operated to close the working circuit only when the dynamo-voltage exceeds the storage-battery voltage by an amount sufficient to cause the coil $e$ to overcome the joint effect of the coil $l$ and the spring $w$. Upon the closing of the working circuit the coil $t$ receives a current from the dynamo and adds its effect to that of the coil $e$, thus producing a greater pressure of the circuit-closer $p$ and making its contact firm and sure. The working circuit will then remain closed as long as the combined effect of the coils $e$ and $t$ exceed the combined effect of the coil $l$ and spring $w$. When the working circuit is thus closed, the coil $l$ will have impressed upon it the voltage of the dynamo, which will be greater than that of the storage battery, and hence the coil $l$ will exert an increased neutralizing effect on the coil $e$; but this will be more than counterbalanced by the added effect of the coil $t$. If now for any reason the voltage of the dynamo decreases, as it approaches the storage-battery voltage the current in the coil $t$ approaches zero, and the differential effect of the coils $t$ and $e$ acting against the coil $l$ and spring $w$ diminishes until at some point which is necessarily reached before the voltage of the dynamo has become equal to or less than that of the battery the spring $w$ draws back the circuit-closer $p$ and breaks the working circuit. Hence it will be impossible for the storage battery to discharge through the dynamo, no matter what their respective voltages may be. A continued decrease of the dynamo-voltage beyond the point where the working circuit is broken will diminish the magnetic effect of the relay-magnet $g'$ until the spring $v$ will draw back the circuit-closer $i$ and break the circuit through the conductor $k$ and its connections, and thus prevent a wasteful leakage of current through the same from the storage battery.

In the arrangement of my invention illustrated in Fig. 2 the coil $t$ is in a shunt from the working circuit instead of being in series with it, as in Fig. 1, and hence it receives a different proportion of the total current. Its function and mode of operation are, however, the same as in the arrangement shown in Fig. 1.

In Fig. 3 I have illustrated my invention so arranged that the core $n$ of the switch-magnet includes the core of one of the field-magnets of the dynamo, and the field-coil mounted on said field-core constitutes also the coil $e$ of my switch and performs its functions. Otherwise the arrangement shown in Fig. 3 is substantially the same in its construction and operation as that shown in Fig. 1.

I claim as my invention—

1. An automatic electric switch comprising a magnet-core provided with a non-polarized armature, a working circuit controlled by said armature, and two coils on said magnet-core wound and connected to oppose each other, the said armature being operated by the differential effect of the said coils, as set forth.

2. An automatic electric switch comprising a magnet-core provided with a non-polarized armature, a working circuit controlled by said armature, two coils on said magnet-core wound and connected to oppose each other, the said armature being operated by the differential effect of the said coils, and a relay arranged to make and break the circuit through one of said coils, for the purpose set forth.

3. An automatic electric switch comprising a magnet-core provided with a non-polarized armature, a working circuit controlled by said armature, two coils on said magnet-core wound and connected to oppose each other, and a relay energized simultaneously with one of said coils to control the circuit through the other coil, for the purpose set forth.

4. An automatic electric switch comprising a magnet-core provided with a non-polarized armature, a working circuit controlled by said armature, two coils on said magnet-core wound and connected to oppose each other and arranged to operate the said armature by their differential effect, and a third coil on said magnet-core arranged to be energized when the working circuit is closed, for the purpose set forth.

5. An automatic electric switch comprising a magnet-core provided with a non-polarized armature, arranged to bridge the poles thereof, a working circuit controlled by said armature, one or more coils on said magnet-core for operating said armature, and a supplementary coil on said magnetic circuit arranged to be energized when the working circuit is closed, for the purpose set forth.

6. An automatic electric switch comprising a magnet-core provided with a non-polarized armature, a working circuit controlled by said armature, two coils on said magnet-core wound and connected to oppose each other and arranged to have independent voltages impressed upon them, a relay in series with one of said coils and controlling the circuit through the other coil, and a third coil on said magnet-core adapted to be energized when the working circuit is closed, for the purpose set forth.

In testimony whereof I affix my signature in presence of two witnesses.

WALTER L. NEGBAUR.

Witnesses:
    N. A. DEXTER,
    J. J. FEELY.